United States Patent
Ahn et al.

(10) Patent No.: US 8,866,919 B2
(45) Date of Patent: Oct. 21, 2014

(54) SHAKE CORRECTION MODULE, CAMERA MODULE COMPRISING THE SAME, AND METHOD OF MANUFACTURING THE CAMERA MODULE

(75) Inventors: Jae-wook Ahn, Changwon (KR); Nam-il Kim, Changwon (KR); Jae-hwan Jeong, Changwon (KR); Tae-ho Kim, Changwon (KR); Kyung-sik Shin, Yongin-si (KR)

(73) Assignees: Samsung Techwin Co., Ltd., Changwon (KR); Optis Co., Ltd., Suwon (KR)

( * ) Notice: Subject to any disclaimer, the term of this patent is extended or adjusted under 35 U.S.C. 154(b) by 500 days.

(21) Appl. No.: 12/907,359

(22) Filed: Oct. 19, 2010

(65) Prior Publication Data
US 2011/0122267 A1    May 26, 2011

(30) Foreign Application Priority Data

Nov. 6, 2009  (KR) .................... 10-2009-0107090
Nov. 20, 2009 (KR) .................... 10-2009-0112800

(51) Int. Cl.
H04N 5/228    (2006.01)
G03B 17/00    (2006.01)
H04N 5/225    (2006.01)
H04N 5/232    (2006.01)
G03B 5/00     (2006.01)

(52) U.S. Cl.
CPC .............. *G03B 5/00* (2013.01); *H04N 5/2253* (2013.01); *H04N 5/23287* (2013.01); *H04N 5/2257* (2013.01); *H04N 5/23248* (2013.01)
USPC ........................................ 348/208.7; 396/55

(58) Field of Classification Search
USPC ............... 348/208.99–208.13, 554; 359/554; 396/52, 54, 55
See application file for complete search history.

(56) References Cited

U.S. PATENT DOCUMENTS

| 5,414,444 A | 5/1995 | Britz |
| 2003/0128442 A1* | 7/2003 | Tanaka et al. ............... 359/819 |

(Continued)

FOREIGN PATENT DOCUMENTS

| CN | 101401023 A | 4/2009 |
| JP | 7-274056 A | 10/1995 |

(Continued)

OTHER PUBLICATIONS

Communication dated Sep. 24, 2013 issued by the State Intellectual Property Office of P.R. China in counterpart Chinese Patent Application No. 201010540736.X.

*Primary Examiner* — Twyler Haskins
*Assistant Examiner* — Carramah J Quiett
(74) *Attorney, Agent, or Firm* — Sughrue Mion, PLLC

(57) ABSTRACT

A shake correction module, a camera module including the same, and a method of manufacturing the camera module are provided. The shake correction module includes: a hinge member which supports rotation movement of an optical module based on each of at least two axes at least by using an elastic characteristic of the hinge member, wherein the optical module comprises an image sensor; a base member to which the hinge member is installed; and a driving motor which rotates the hinge member based on the each of the at least two axes with respect to the base member, in order to manufacture a structure for supporting two-axes rotation of the optical module to be simple and reliable with a low manufacturing cost.

28 Claims, 9 Drawing Sheets

(56) References Cited

U.S. PATENT DOCUMENTS

2006/0033818 A1    2/2006  Wada et al.
2006/0234557 A1*  10/2006  Chen ............................ 439/609
2009/0039734 A1*   2/2009  Takahashi et al. ....... 310/323.02
2009/0052037 A1*   2/2009  Wernersson .................. 359/554
2009/0122406 A1    5/2009  Rouvinen et al.

FOREIGN PATENT DOCUMENTS

| JP | 2008-268756 A | 11/2008 |
| JP | 2008-304850 A | 12/2008 |
| KR | 10-0233051 B1 | 9/1999 |
| KR | 10-2007-0116356 A | 12/2007 |

* cited by examiner

SHAKE CORRECTION MODULE, CAMERA MODULE COMPRISING THE SAME, AND METHOD OF MANUFACTURING THE CAMERA MODULE

CROSS-REFERENCE TO RELATED PATENT APPLICATIONS

This application claims priority from Korean Patent Application No. 10-2009-0107090, filed on Nov. 6, 2009, and Korean Patent Application No. 10-2009-0112800, filed on Nov. 20, 2009, the disclosures of which are incorporated herein in their entirety by reference.

BACKGROUND

1. Field

Apparatuses and methods consistent with exemplary embodiments relate to a shake correction module, a camera module including the same, and a method of manufacturing the camera module, and more particularly, to a shake correction module for preventing a shake by applying a vibration to a photographing module including an image sensor, a camera module including the shake correction module, and a method of manufacturing the camera module.

2. Description of the Related Art

A digital camera module captures an image by using an image sensor such as a charge-coupled device (CCD) or a complementary metal-oxide semiconductor (CMOS) instead of using a film. A digital camera module including an image sensor may be employed in mobile devices that transmit moving pictures and capture images, for example, mobile phones, laptop computers, portable digital assistances (PDAs), cameras in monitors, rear monitoring cameras for vehicles installed to bumpers, and interphone cameras.

In general, a camera module employed in portable electronic devices is manufactured to have a high pixel resolution, be miniaturized, and be light-weight. An image captured by the high-pixel camera module is sensitive to an external disturbance, and thus, if the camera module is shaken by a certain force, the image may be distorted. Accordingly, a shake correction is needed to clearly capture an image of a subject in an optical system of the camera module.

SUMMARY

A shake occurring to a camera module may be corrected by linearly vibrating an imaging surface of an image sensor in a camera module along an X-axis direction and a Y-axis direction of rectangular coordinates on a plane parallel to the imaging surface. However, a shake of a user capturing an image by using a camera may not be always vibrated in the X-axis direction or the Y-axis direction, and thus, more than a linear correction in the X-axis direction and the Y-axis direction may be required.

As a method of mechanically correcting a shake, an image sensor may be vibrated in a direction corresponding to a direction in which a shake occurs, and thus, a shake-offset image may be obtained. Further, as a motion of the image sensor is affected by a motion of or a force applied to a flexible printed circuit board (PCB) that is electrically connected to the image sensor, additional shake correction may be required.

One or more of exemplary embodiments provide a shake correction module including a support unit having a simple structure, wherein the support unit corrects a shake by swing-driving an optical module including an image sensor based on two axes, and supports rotational driving in two axis directions of the optical module, and a camera module including the shake correction module.

One or more exemplary embodiments also provide a camera module that may accurately control driving of an optical module for correcting a shake in order not to transmit an external disturbance to the optical module even when the external disturbance is applied to a flexible printed circuit board (PCB) that is electrically connected to an image sensor, and a method of manufacturing a camera module.

According to an aspect of an exemplary embodiment, there is provided a shake correction module including: a hinge member which supports rotation movement of an optical module based on each of at least two axes at least by using an elastic characteristic of the hinge member, wherein the optical module comprises an image sensor; a base member to which the hinge member is installed; and a driving motor which rotates the hinge member based on the each of the at least two axes with respect to the base member. The optical module may be accommodated by the hinge member which includes an upper body and a lower body, wherein the optical module may be attached to the upper body of the hinge member, and the base member may be attached to the lower body of the hinge member, and wherein the upper part of the hinge member may be configured to rotate with respect to the base member based on each of the at least two axes on a same plane at least by using the elastic characteristic of the hinge member.

The optical module moves back and forth based on two axes, and thus, shake correction of an image may be well accomplished. Also, the hinge member is formed of one same material and moves back and forth by using its own elasticity so that the hinge member may be driven without bending or distorting while supporting the optical module.

The hinge member may be formed of an elastic material, for example, plastic. The hinge member may be formed of plastic, and thus, may be formed by way of injection molding. Accordingly, a manufacturing cost may be significantly reduced and manufacturing and assembling processes may be simplified.

The hinge member may additionally include a middle body between the upper body and the lower body. The upper body and the middle body may be connected to each other by at least one first hinge having the elastic characteristic so that the upper body rotates based on a first axis of the at least two axes with respect to the middle body. The middle body and the lower body may be connected to each other by at least one second hinge having the elastic characteristic so that the middle body rotates based on a second axis of the at least two axes with respect to the lower body, and the optical module may be installed to the upper body. Accordingly, the upper body may move back and forth based on the two axes with respect to the lower body of the hinge member.

The driving motor may be a voice coil motor (VCM) unit including permanent magnets and coils. The VCM unit may include pairs of first VCMs that face each other in the first axis direction, and pairs of second VCMs that face each other in the second axis direction perpendicular to the first axis direction.

The magnets may be installed to sides of the hinge member, and the coils are installed spaced apart from the magnets in correspondence to the magnets, for example, a moving magnet type. For example, the coils may be installed to the base member of the housing. Unlikely, the coil may be installed to the side of the hinge member, and the permanent magnet may be moving coil which is spaced apart from the coil. Accordingly, when the VCM unit is operated, the upper body of the hinge member may move back and forth based on the base member.

The shake correction module may further include a housing combined to the base member to surround an outer wall of the base member, wherein the housing comprises a material for shielding an electromagnetic interference (EMI) and prevents foreign substances from entering the optical module from outside.

The optical module may be formed of a combination of one or two selected from the group consisting of auto-focusing (AF) optical system, a single-focusing optical system, a dual optical system and a zoom optical system.

An intersecting point of the two axes may correspond to a center of an imaging surface of the image sensor. In particular, the two axes may cross each other on a same plane. Accordingly, the optical module may swing based on the two axes, and thus, an image having improved quality may be obtained. In particular, when an X-axis and a Y-axis cross each other on the same plane, an image having excellent quality may be obtained.

According to an aspect of another exemplary embodiment, there is provided a camera module including: an optical module including an image sensor; and a shake correction module including: a hinge member which supports rotation movement of an optical module based on at least one axis at least by using an elastic characteristic of the hinge member; a base member to which the hinge member is installed; and a driving motor which rotates the hinge member based on the at least one axis with respect to the base member. The hinge member and/or optical module may be configured such that the optical module is installed to and removed from the hinge member in a cartridge form Accordingly, assembling is improved and various shake correction functions may be applied to various optical modules by using one shake correction module. In particular, shake correction functions may be easily applied to general optical modules which do not have such shake correction functions.

The camera module may further include a flexible printed circuit board (PCB) in which one part thereof is electrically connected to the optical module and at least one other part thereof is combined to a fixed portion of the shake correction module, in order for the optical module to be electrically connected through the flexible PCB with an outside element.

More specifically, the one part of the flexible PCB may be fixed to a lower part of one side of the optical module, and a middle part of the flexible PCB may be fixed to a part of the base member opposite to the lower part of the optical module. Accordingly, even when an external force is applied to a protruding part of the flexible PCB, an external force during rotational movement of the optical module may be minimized, and accurate shake correction may be possible.

The one part and the middle part of the flexible PCB may be disposed to have different heights in a perpendicular direction to a photography surface of the image sensor so that a cross-section of the flexible PCB forms a curve. The curve may include at least one point of inflection. Accordingly, parts of the flexible PCB attached to the optical module may not be affected by an external force.

The one part and the at least one other part of the flexible PCB may be supported by reinforcing plates, respectively.

The middle part of the flexible PCB may be fixed to the base member in such a way that at least one protrusion protruding from the part of the base member toward the flexible PCB penetrates at least the flexible PCB, and is thermally fused to have wider end portion. The middle part of the flexible PCB may be fixed to the base member by fixing protrusions protruding from the base member.

The optical module may include the image sensor and a hard printed circuit board (PCB) that is electrically connected to a bottom side of the image sensor and the one part of the flexible PCB may be attached to the hard PCB by an anisotropic conductive film (ACF) to which conductive balls are attached.

The shake correction module may include solder plates that electrically connect the driving motor to the flexible PCB and a part of the driving motor adjacent to the middle part of the flexible PCB is electrically connected to the solder plates, and thus fixed to the base member.

According to another aspect of the present invention, there is provided a method of manufacturing a camera module, the method including: providing a shake correction module for driving an optical module including an image sensor to rotate based on at least one axis and supporting motion of the optical module; inserting the optical module in the shake correction module; disposing a flexible printed circuit board (PCB) that electrically connects the optical module with an outside element; electrically connecting and fixing one part of the flexible PCB to the optical module; and fixing another part of the flexible PCB to a fixed portion of the shake correction module.

The one part and another part of the flexible PCB may be disposed to have different heights in a perpendicular direction to a photography surface of the image sensor so that a cross-section of the flexible PCB forms a curve.

BRIEF DESCRIPTION OF DRAWINGS

The above and other aspects will become more apparent by describing in detail exemplary embodiments with reference to the attached drawings, in which.

DETAILED DESCRIPTION OF EXEMPLARY EMBODIMENTS

Hereinafter, exemplary embodiments will be described more fully with reference to the accompanying drawings.

Figure 1:
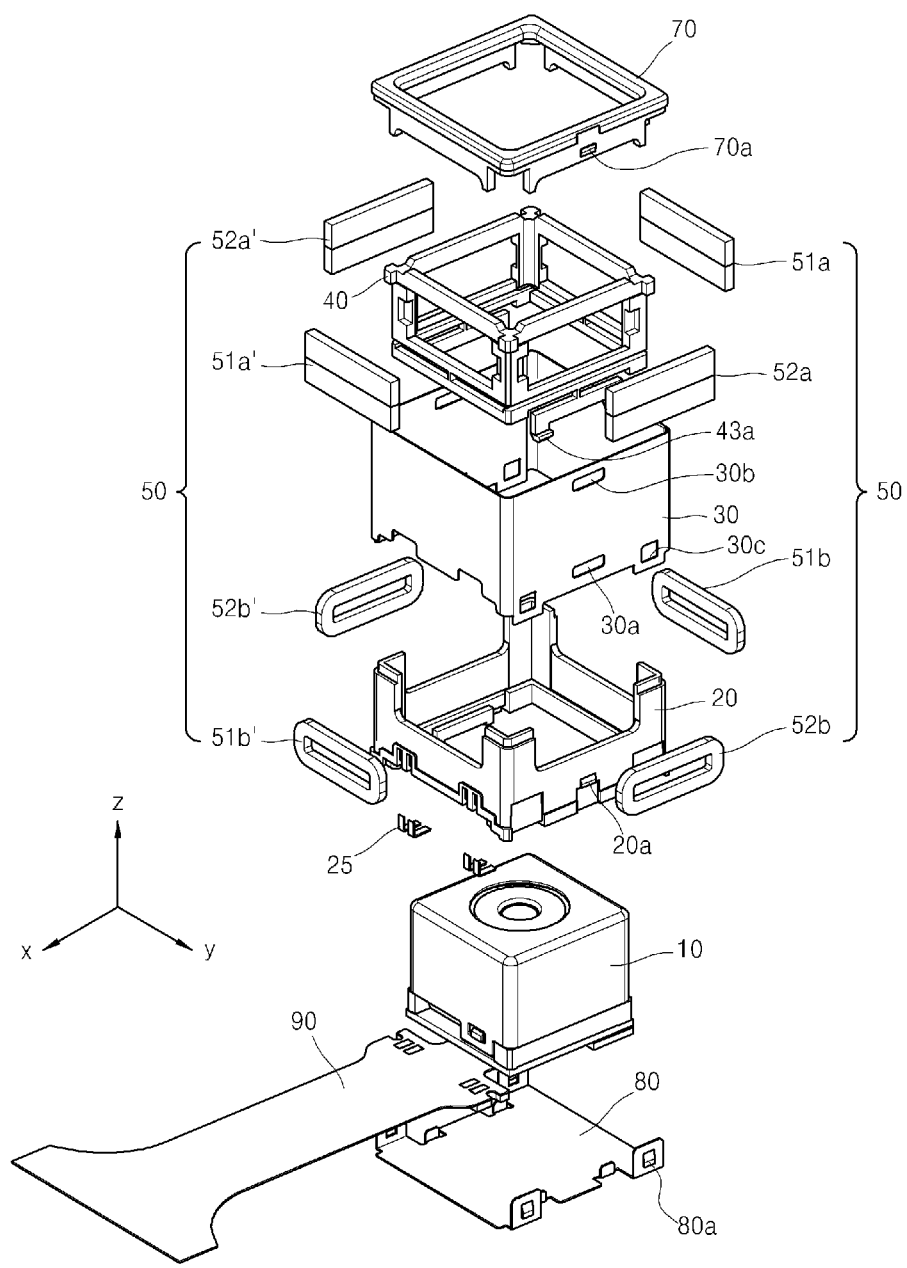
FIG. 1 is an exploded perspective view of a camera module, according to an exemplary embodiment.

FIG. 1 is an exploded perspective view of a camera module according to an exemplary embodiment.

Figure 6:
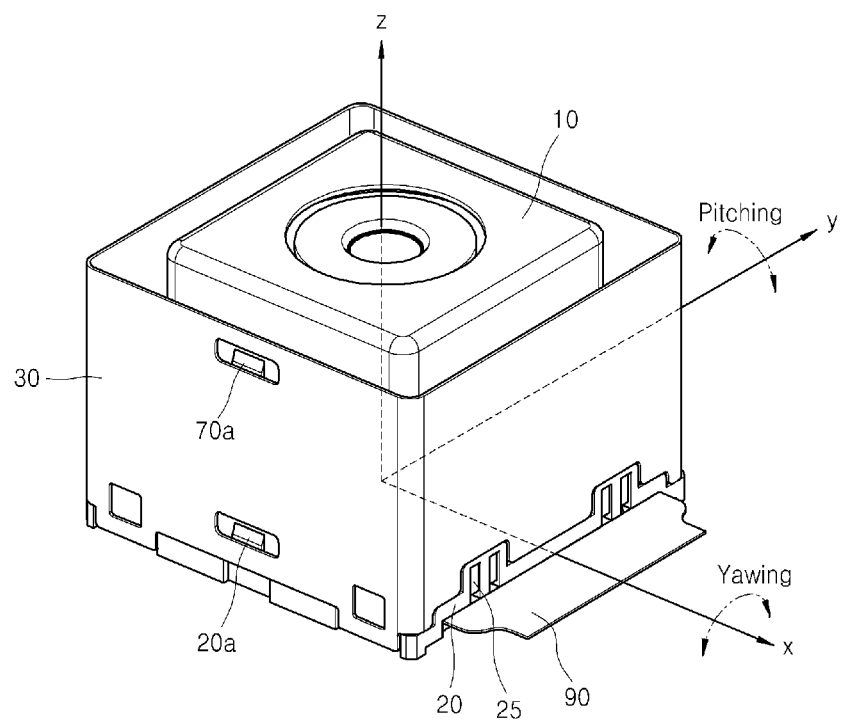
FIG. 6 is a perspective view of the camera module of FIG. 1 in a combined state without a cap, according to an exemplary embodiment.
Figure 7:
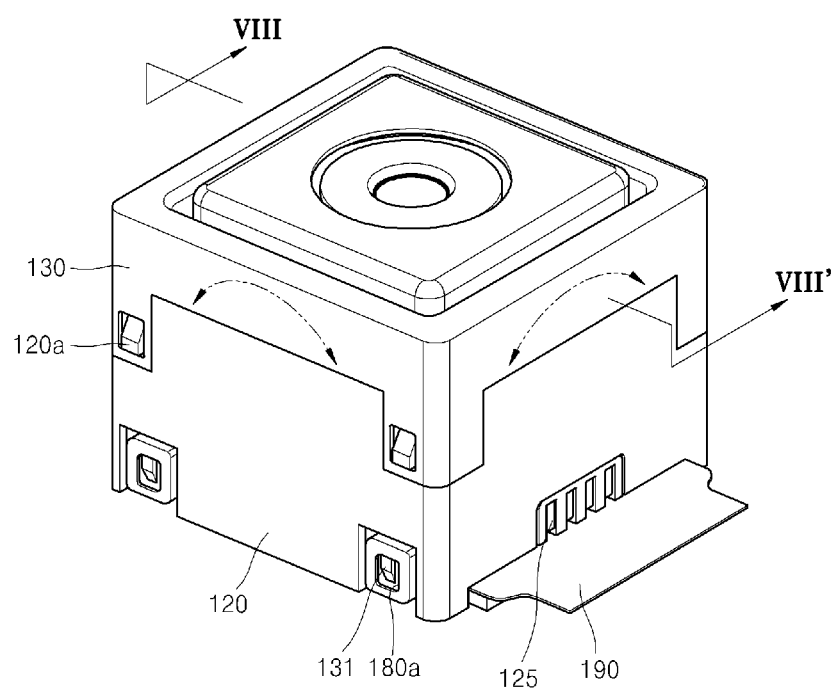
FIG. 7 is a perspective view of a camera module in a combined state without a cap, according to another exemplary embodiment.
Figure 8:
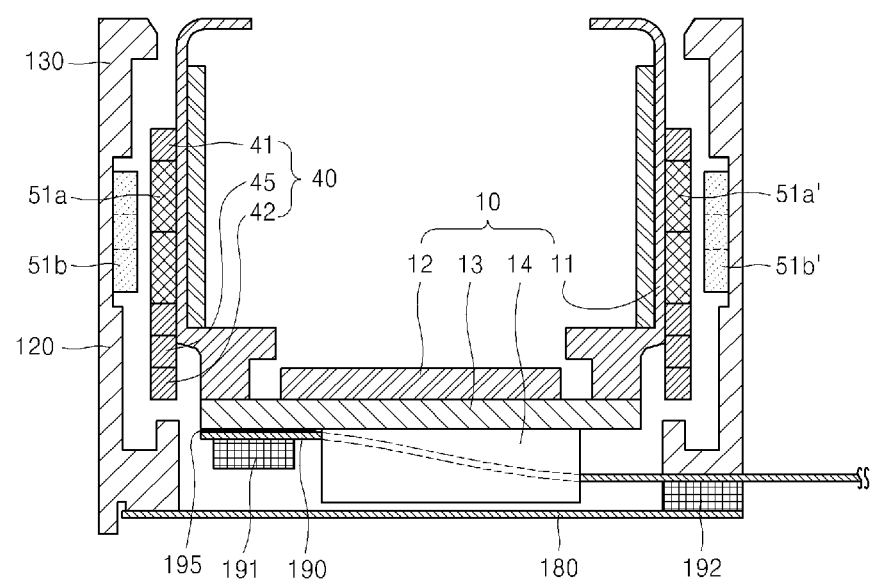
FIG. 8 is a cross-sectional view of the camera module of FIG. 7 seen along a line of VIII-VIII' in FIG. 7, according to another exemplary embodiment.
Figure 9:
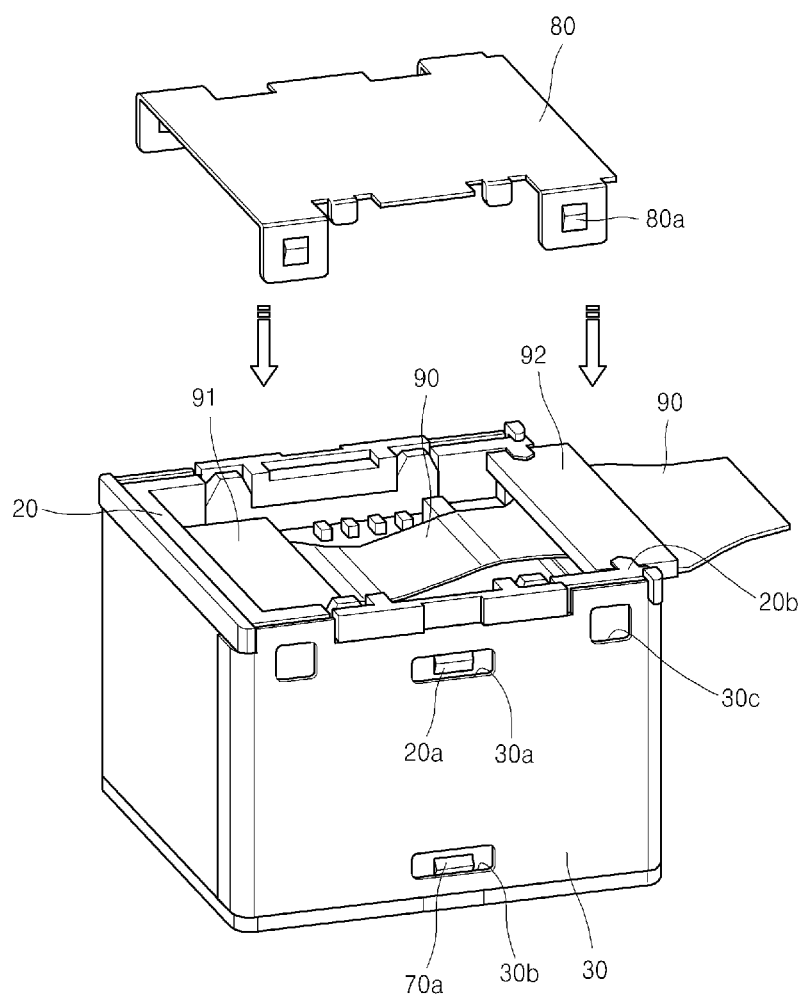
FIG. 9 is a bottom perspective view of the camera module of FIG. 6 before a cover plate is combined thereto, according to another exemplary embodiment.
Figure 10:
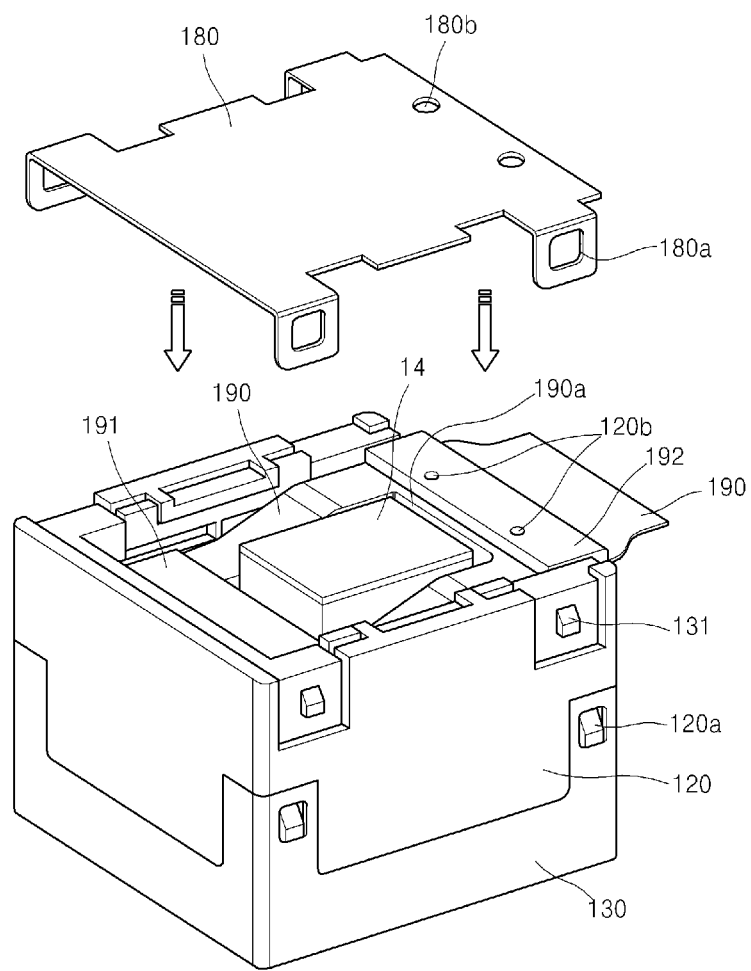
FIG. 10 is a bottom perspective view of the camera module of FIG. 7 before a cover plate is combined thereto, according to another exemplary embodiment.

Referring to FIG. 1, the camera module according to the current exemplary embodiment may include an optical module 10, a base member 20, a housing 30, a hinge member 40, a voice coil motor 50, a cap 70, a cover plate 80, and a flexible printed circuit board (PCB) 90. A perspective view of the camera module of FIG. 1 is illustrated in FIG. 6, and a bottom perspective view of the camera module of FIG. 1 is illustrated in FIG. 9. However, parts of the camera module of FIG. 1 such as the optical module 10, the hinge member 40, and the voice coil motor 50 may be employed in a camera module having different forms of a base member 120, a housing 130, a cover plate 180, etc. as illustrated in FIGS. 7, 8 and 10, according to another exemplary embodiment. However, a same or similar operational principle of the camera module of FIGS. 1, 6 and 9 is applied to the camera module of FIGS. 7, 8 and 10. Thus, the operational principle of the camera module of FIGS. 1, 6 and 9 may be explained with reference to the drawings directed to the camera module of FIGS. 7, 8 and 10.

As shown in FIG. 8, the optical module 10 includes an image sensor 12, an incident lens (not shown), and lenses that allow light indicating an image of a subject to be formed on the image sensor 12. A hard PCB (HPBC) 13 is disposed below the image sensor 12 and is electrically connected to the image sensor 12. In some cases, a gyro sensor 14 may be additionally disposed below the HPCB 13. The gyro sensor 14 may be disposed on a portion (of the camera module) other than the optical module 10.

The image sensor 12 as a member of the optical module 10 is moved when the optical module 10 moves. The optical module 10 may be an optical system with an auto-focusing capability, a single-focusing optical system, a dual optical system in which a single-focusing optical system and a zoom optical system are simultaneously available, or a zoom optical system.

The hinge member 40 accommodates the optical module 10 such that the optical module 10 is installed either detachably or not detachably in the hinge member 40. In particular, an upper part of the hinge member 40 is mounted to the optical module 10. The upper part of the hinge member 40 may be configured to swing in two axis directions, such as X-axis and Y-axis directions, with respect to a lower part of the hinge member 40. The hinge member 40 will be described later in detail with reference to FIGS. 2 and 5.

The base member 20 accommodates the hinge member 40, wherein the hinge member 40 is installed inside of the base member 20. In particular, the lower part of the hinge member 40 is mounted to the base member 20. The hinge member 40 is mounted to the base member 20 by a hook structure, and then, is fixed to the base member 20 by an ultraviolet rays curing bond. However, the inventive concept is not limited thereto, and various mounting and fixing methods may be used.

As described above, the upper part of the hinge member 40 fixed to the optical module 10 may swing with respect to the lower part of the hinge member 40 based on the two axes, and consequently, the optical module 10 may be rotated, and more specifically, swing with respect to the base member 20 based on the two axes.

The housing 30 is combined to the base member 20 to surround an outer wall of the base member 20. The housing 30 may be hooked onto the base member 20. Thus, assembling of the housing 30 into the base member 20 and disassembling of the housing 30 from the base member 20 are easy. However, various combining method may be used in addition to a hook method. The housing 30 may be formed to prevent electromagnetic interference (EMI). Also, the housing 30 may be combined to the base member 20 and the cap 70, and thus, may prevent foreign substances from flowing to the optical module 10 from outside.

On the other hand, the camera module may not include the housing 30. In this case, the base member 20 may function as the housing 30.

The voice coil motor 50 may be incorporated to swing the optical module 10 based on two axes with respect to the base member 20 and/or the housing 30. The voice coil motor 50 may include pairs of first voice coil motors (51a, 51b) and (51a', 51b'), and pairs of second voice coil motors (52a, 52b) and (52a', 52b'). The pairs of the voice coil motor 50 may each include a coil and a permanent magnet that correspond to each other.

Figure 3:
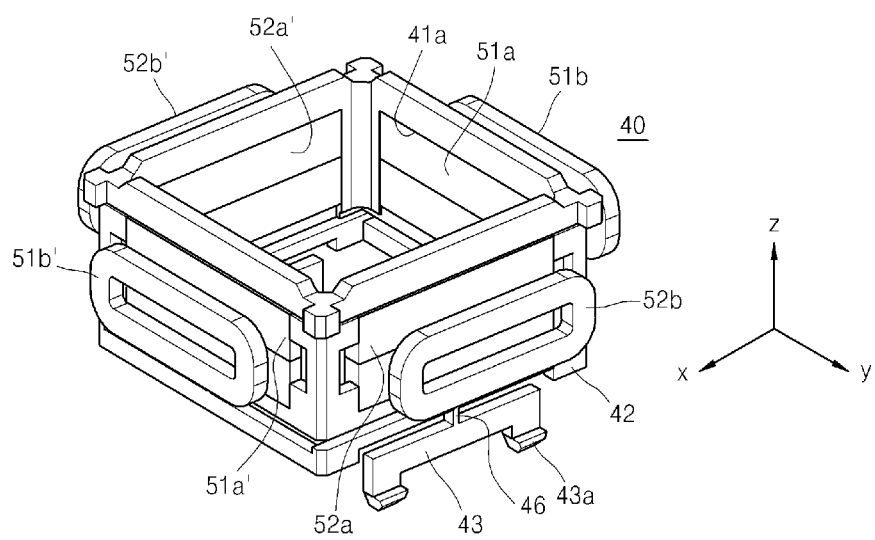
FIG. 3 is a perspective view of a hinge member combined with voice coil motors, according to an exemplary embodiment.

As illustrated in FIGS. 1 and 3, reference numbers 51a, 51a', 52a, and 52a' indicate permanent magnets and are combined to be fixed to the hinge member 40, and in particular, the upper part of the hinge member 40. The reference numbers 51b, 51b', 52b, and 52b' indicate coils, and are each disposed spaced apart from the permanent magnets 51a, 51a', 52a, and 52a' in the X-axis direction and the Y-axis direction, respectively. The coils 51b, 51b', 52b, and 52b' may be combined to the base member 20 by using an ultraviolet rays curing bond; however, the inventive concept is not limited thereto. For example, the coils 51b, 51b', 52b, and 52b' may be combined to the housing 30, which surrounds the base member 20, or may be combined by using different methods.

Referring to FIG. 3, the pairs of first voice coil motors (51a, 51b) and (51a', 51b') are each disposed to face each other, and the pairs of second voice coil motors (52a, 52b) and (52a', 52b') are each disposed to face each other. The pairs of first voice coil motors (51a, 51b) and (51a', 51b') and the pairs of second voice coil motors (52a, 52b) and (52a', 52b') are disposed to respectively face in directions perpendicular to each other. An operational principle of the voice coil motors will be described later in detail with reference to FIG. 4.

In the drawings, moving-magnet-type voice coil motors are illustrated. However, the inventive concept is not limited thereto, and thus, moving-coil-type voice coil motors may be used instead of the moving-magnet-type voice coil motors. In the moving-coil-type voice coil motors, coils are combined to the moving hinge member 40, and permanent magnets are combined to the fixed base member 20 or housing 30. An operational principle of the moving-coil-type voice coil motors is similar to that of the moving-magnet-type voice coil motors, and thus, further descriptions thereof will be omitted.

The inventive concept is not limited to a shake correction module or camera module that drives the voice coil motor 50. For example, a piezoelectric motor or a step motor may be used as a driving motor for swinging the hinge member 40 based on the two axes. In this case, a first motor may be configured to swing a middle body of the hinge member 40 with respect to any one axis, and a second motor may be configured to swing an upper body of the hinge member with respect to the other axis.

Figure 2:
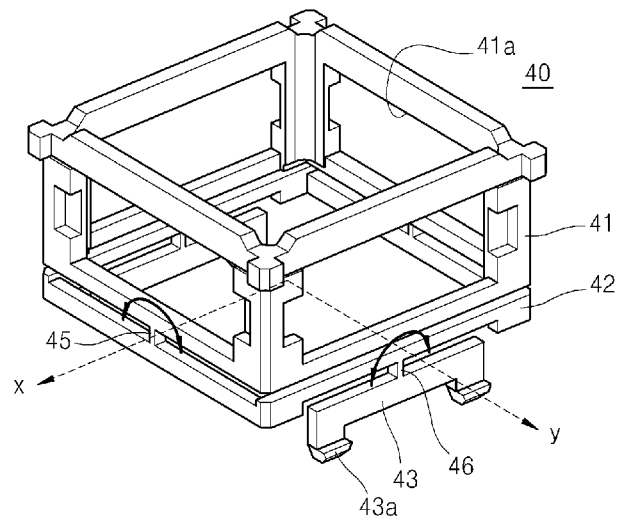
FIG. 2 is a perspective view of a hinge member, according to an exemplary embodiment.

The hinge member 40 supporting the swing operation of the optical module 10 is now described with reference to FIG. 2 which illustrates a perspective view of the hinge member 40, according to an exemplary embodiment.

The hinge member 40 may be divided into an upper body 41, a middle body 42, and a lower body 43. The upper body 41 and the middle body 42 are connected to each other by a pair of first hinges 45, and the middle body 42 and the lower body 43 are connected to each other by a pair of second hinges 46. The first hinges 45 are disposed to face each other, and the second hinges 46 are also disposed to face each other. Also, the pair of first hinges 45 and the pair of second hinges 46 are disposed to respectively face in directions perpendicular to each other.

The hinge member 40 may be formed of a flexible material, for example, plastic. Thus, the hinge member 40 may be elastic. In a shake correction module embodied into the camera module according to the current exemplary embodiment, the hinge member 40 is formed of plastic, and thus, may be formed by way of injection molding. Accordingly, a manufacturing cost may be significantly reduced, and manufacturing and assembling processes may be simplified. However, the hinge member 40 may not be always formed of plastic, and may be formed of any material that is elastic. For example, the hinge member 40 may be formed of a rubber material, a metal material that is elastic, or a material in which plastic or rubber is used together with a metal.

The pair of first hinges 45, which connect the upper body 41 with the middle body 42, may allow the upper body 41 to swing with respect to the middle body 42 based on the X-axis due to a restoring force by the elasticity of the material of the first hinges 45. Similarly, the middle body 42 connected to the lower body 43 by the pair of second hinges 46 may swing with respect to the lower body 43 based on the Y-axis.

An intersecting point of the X-axis and the Y-axis, which are swing axes, corresponds to a center of an imaging surface of the image sensor 12 included in the optical module 10. Here, the intersection may be on the same plane; however, the inventive concept is not limited thereto. An optical axis corresponds to the center of the imaging surface. The shake correction module according to the exemplary embodiment is configured to swing based on the two axes while focusing on the optical axis, and thus, may obtain an image having improved quality compared to a general shake correction module. In particular, when the X-axis and the Y-axis cross each other on the same plane, an image having excellent quality may be obtained. Also the first hinges 45 and the second hinges 46 are formed as parts of the hinge member 40. Thus, the hinge member 40 can be driven without bending or distorting support units during a swing operation.

Figure 5:
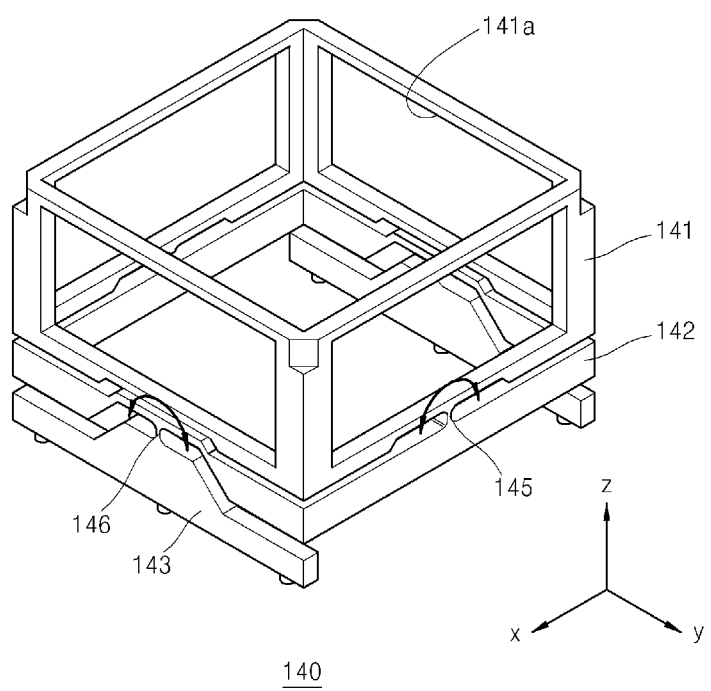
FIG. 5 is a perspective view of a hinge member, according to another exemplary embodiment.

As illustrated in FIG. 5, a modified hinge member 140 may be used. The hinge member 140 is the same as the hinge member 40 in that the hinge members 40 and 140 may include upper bodies 41 and 141, middle bodies 42 and 142, and lower bodies 43 and 143, respectively, wherein the upper bodies 41 and 141 and the middle bodies 42 and 142 are connected by a pair of first hinges 45 and 145, and the middle bodies 42 and 142 and the lower bodies 43 and 143 are connected by a pair of second hinges 46 and 146. However, shapes of a particular part of the hinge members 40 and 140 are different from each other. For example, the lower body 43 of the hinge member 40 has a hook structure for hook-combining with the base member 20, whereas the lower body 143 of the hinge member 140 may not have a hook structure.

Figure 4:
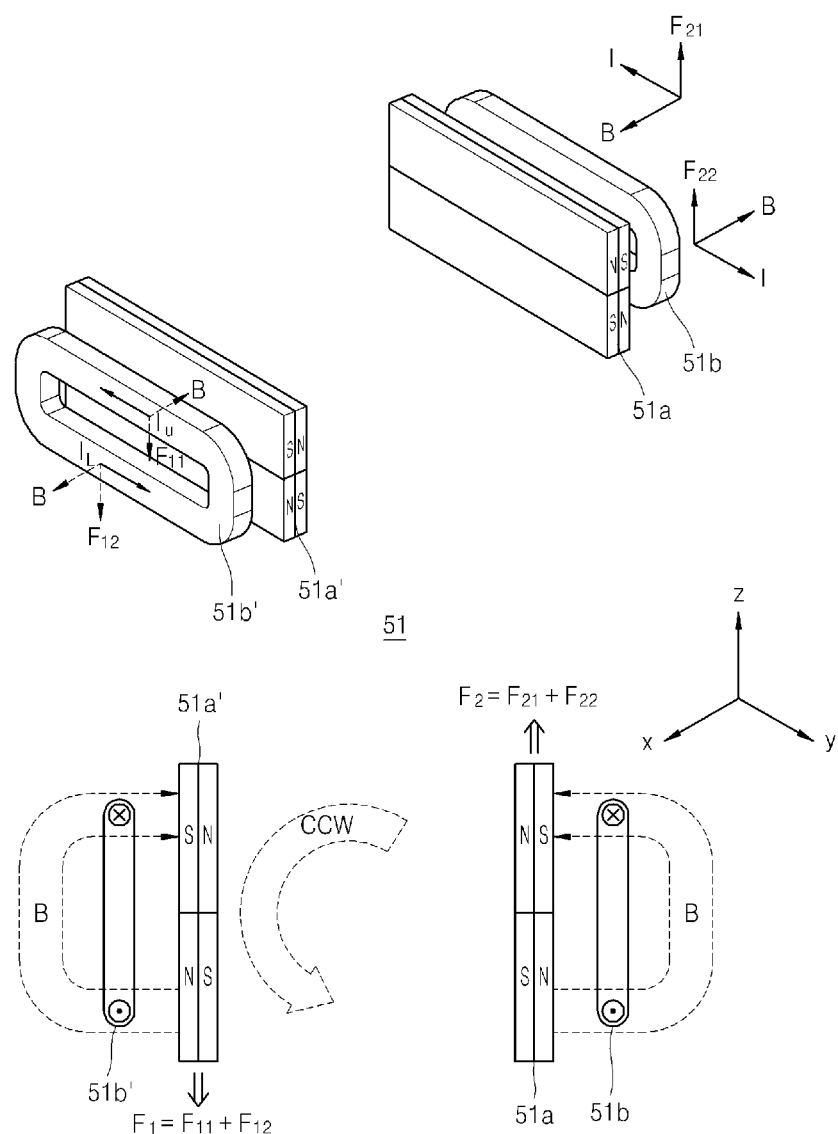
FIG. 4 illustrates an operational principle of pairs of first voice coil motors, according to an exemplary embodiment.

An activating mechanism of the pairs of first voice coil motors (51a, 51b) and (51a', 51b') is now described with reference to FIGS. 3 and 4. In the first voice motors 51a and 51b, a current I flowing in an upper part of the coil 51b flows in a negative direction of the Y-axis and a magnetic field B is directed in a positive direction of the X-axis. Thus, a force F21 is exerted in an upward direction (a positive direction of the Z-axis) due to Fleming's left-hand rule. The current I flowing in a lower part of the coil 51b flows in a positive direction of the Y-axis and the magnetic field B is directed in a negative direction of the X-axis. Thus, a force F22 is exerted in an upward direction (the positive direction of the Z-axis) due to Fleming's left-hand rule. Accordingly, a force is exerted in an upward direction in the first voice motors 51a and 51b. In the first voice motors 51a' and 51b', which are opposite to the first voice motors 51a and 51b, a force is exerted in a downward direction due to the same principle. Here, the coils 51b and 51b' are fixed to the base member 20 or the housing 30 in order to not move, and thus, the upper body 41 of the hinge member 40 and optical module 10 to which the permanent magnet 51a and 51a' are installed may move. Accordingly, in such a configuration as illustrated in FIG. 4, the optical module 10 may swing in such a way that the optical module 10 rotates by a predetermined angle in a counter clockwise direction based on the Y-axis. If a direction of a current applied to the coils 51b and 51b' is reversed, the optical module 10 may swing operate in such a way that the optical module 10 rotates by a predetermined angle in an opposite direction, that is, in a clockwise direction, based on the Y-axis. Accordingly, a direction of a current applied to the coils 51b and 51b' alternates, and thus, the optical module 10 may move back and forth in both directions based on one axis, which is the Y-axis in the current exemplary embodiment.

The base member 20, the housing 30, the hinge member 40, and the voice coil motor 50 described above are shake correction modules and are driven in cooperation with each other.

A swing operation of the optical module 10 in the shake correction modules 20, 30, 40, and 50 is now described with reference to FIGS. 3-10. The optical module 10 may move back and forth, that is, rolled, based on the Y-axis by the pairs of first voice coil motors (51a, 51b) and (51a', 51b'). Also, the optical module 10 may move back and forth, that is, pitched, based on the X-axis by the pairs of second voice coil motors (52a, 52b) and (52a', 52b'). Accordingly, back and forth rotation vibration is applied to the optical module 10 based on the two axes, and thus, a shake of an image may be removed.

A circuit pattern is formed on each of flexible PCBs 90 and 190. The flexible PCBs 90 and 190 electrically connect the optical module 10 with an outside element. Accordingly, the flexible PCBs 90 and 190 are electrically connected to the HPCB 13. However, the inventive concept is not limited thereto. For example, the HPCB 13 may not be used and a rigid-flexible PCB may be used.

Various methods to connect the flexible PCBs 90 and 190 with the optical module 10 may be used.

As an example, the flexible PCBs 90 and 190 may be connected to the HPCB 13 by an anisotropic conductive film (ACF) 195 (FIG. 8) to which conductive balls are attached. The conductive balls increase electrical conductivity of the ACF 195. However, a general ACF may be used to connect the flexible PCBs 90 and 190 to the HPCB 13. Also, the flexible PCBs 90 and 190 may be electrically connected to the HPCB 13 by interconnecting a connector disposed on the HPCB 13 to a connector disposed on the flexible PCBs 90 and 190. In addition, various connection methods used in semiconductor packaging, for example, flip chip bonding or solder joint, may be used.

The flexible PCBs 90 and 190 are thin. In particular, first reinforcing plates 91 and 191 may be disposed on ends of the flexible PCBs 90 and 190, respectively. The first reinforcing plates 91 and 191 increase a hardness of the ends of the flexible PCBs 90 and 190, respectively, and facilitate electrical connection, thereby increasing durability of the electrical connection structure.

Other parts of the flexible PCBs 90 and 190, for example, middle parts of the flexible PCBs 90 and 190, are fixed to the shake correction module. More specifically, the middle parts of the flexible PCBs 90 and 190 may be fixed to parts that are not moved during a shake correction, for example, a support unit or the base member 20. The ends and middle parts of the flexible PCBs 90 and 190 are fixed. Thus, even when an external force or a shake is applied to other ends of the flexible PCBs 90 and 190, such an external force or a shake is blocked due to the middle parts. Accordingly, an external force during rotational movement of the optical module 10 for a shake correction may be minimized, and accurate shake correction may be possible.

Second reinforcing plates 92 and 192 may be disposed on the middle parts of the flexible PCBs 90 and 190, respectively. The second reinforcing plates 92 and 192 increase a hardness of the middle parts of the flexible PCBs 90 and 190, and facilitate electrical connection, thereby increasing the durability of the electrical connection structure.

The middle parts of the flexible PCBs 90 and 190 may be fixed to a support unit or the base members 20 and 120, respectively, by using various methods. For example, as illustrated in FIG. 10, two protrusions 120b protruding from lower ends of the support unit or the base member 120 penetrate the flexible PCB 190 and/or the second reinforcing plate 192, and then, heat is applied to ends of the protrusions 120b. Thus, the protrusions 120b are fused and fixed to the flexible PCB 190 by increasing a radius of the protrusions 120b. The number of the protrusions may not be two and may be one as long as the middle part of the flexible PCB 190 is not substantially shaken. In addition, as illustrated in FIG. 9, fixing protrusions 20b protruding from both sides of the support unit or the base member 20 to the inside may be used to fix the flexible PCB 90 and the second reinforcing plate 92.

As illustrated in FIG. 8, the flexible PCB 190 may have a smooth S-shape curve between the end and the middle part of the flexible PCB 190. Here, the S-shape curve means a curve in which at least one point of inflection exists between a convex curve and a depressed curve. The S-shape curve of the flexible PCB 190 facilitates the optical module 10 to move back and forth based on two axes freely without being interfered by the flexible PCB 190 the middle part of which is fixed to the base member 120. Therefore, accurate shake correction may be achieved.

Also, the flexible PCB 190 may electrically connect a driving motor of the shake correction module with the outside. Accordingly, solder plates 25 and 125 that are formed on the support unit or base members 20 and 120 and electrically connected to the coils 51b, 51b', 52b, and 52b' in the driving motor, for example, the voice coil motor, may be connected to the flexible PCB 190. The solder plates 25 and 125 may be formed as illustrated in FIGS. 6 and 7. Parts of the flexible PCBs 90 and 190 are fixed again to the solder plates 25 and 125 by way of soldering, and thus, a shake correction of the optical module 10 may not be affected by an external force.

Referring to FIG. 10, an opening 190a is formed between the end and the middle part of the flexible PCB 190. The opening 190a is a space for the gyro sensor 14 attached to the optical module 10. As described above, if the gyro sensor 14 is not attached to the optical module 10, an opening may not be formed on the flexible PCB 90 as illustrated in FIG. 9.

In the foregoing, a connection structure of the flexible PCBs 90 and 190 has been described with reference to an exemplary embodiment in which the shake correction module includes the hinge member 40 supporting rotational movement based on the two axes. However, the protection scope of the inventive concept is not limited thereto. For example, the connection structure of the flexible PCBs 90 and 190 can be employed in another exemplary embodiment in which balls for supporting rotation are disposed along with springs for restoration on the lower end of the support unit surrounding the optical module 10. That is, the connection structure of the flexible PCBs 90 and 190 may be applied to all shake correction modules capable of a rotation movement based on the two axes.

Hereinafter, a method of assembling the camera module for correcting a shake according to an exemplary embodiment is described.

First, the solder plate 25 is assembled to the base member 20. The solder plate 25 may be tightly fitted to the base member 20, and then, may be bonded by using thermosetting resin. Then, the housing 30 is assembled to the base member 20 by hook structures 20a and 30a so as to form a base assembly. The coils 51b, 51b', 52b, and 52b' of the first and second voice coil motors are combined to the base member 20 or the housing 30 for pre-assembly and are thermoset. Then, the coils 51b, 51b', 52b, and 52b' are electrically connected to the solder plate 25. Here, the permanent magnets (51a, 51a', 52a, and 52b) are assembled and bonded to an opening 41a of the hinge member 40 by using a thermosetting resin so as to form a hinge assembly. The hinge assembly is connected to the base assembly by using a hook structure 43a, and is bonded to the base assembly by using a thermosetting resin, thereby completing manufacture of the shake correction module.

In a camera module of FIG. 9, one end of the flexible PCB 90 is fixed to the optical module 10, and then, the middle part of the flexible PCB 90 is fixed to the shake correction module by the fixing protrusions 20b protruding from the base member 20. Then, the solder plate 25 is electrically connected to the corresponding part of the flexible PCB 90, and a cover plate 80 is disposed thereon. The cover plate 80 may be assembled to the housing 30 or the lower part of the support unit integrally combined with the housing 30 by using hook structures 80a and 30c.

The optical module 10 is inserted in the shake correction modules 20, 30, 40, and 50, and is bonded. In a camera module of FIG. 10, one end of the flexible PCB 190 is fixed to the optical module 10, and then, the solder plate 125 is electrically connected to a corresponding part of the flexible PCB 190. Then, the middle part of the flexible PCB 190 is fixed to the base member 120 by thermal fusing, and a cover plate 180 is disposed thereon. The cover plate 180 may be assembled to the base member 120 or the lower part of the support unit integrally combined with the based member 120 by using hook structures 180a and 131.

In addition, the cap 70 may be assembled to the housing 30 by using hook structures 70a and 30b. The cap 70 may be assembled at any time after the optical module 10 is inserted into the shake correction modules 20, 30, 40, and 50 and fixed to the shake correction modules 20, 30, 40, and 50.

Here, the shake correction modules 20, 30, 40, and 50 may be configured such that the optical module 10 is installed to and removed from the shake correction modules 20, 30, 40, and 50 in a cartridge form. More specifically, the optical module 10 may be installed to and removed from a swing movable part in the shake correction modules 20, 30, 40, and 50, which is, for example, the upper body 41 of the hinge member 40. Accordingly, assembling is improved and various shake correction functions may be applied to various optical modules having the same sizes.

While the exemplary embodiments have been particularly shown and described with reference to the accompanying drawings, it will be understood by those of ordinary skill in the art that various changes in form and details may be made therein without departing from the spirit and scope of the inventive concept as defined by the following claims.

What is claimed is:

1. A shake correction module comprising:
   a hinge member which supports rotation movement of an optical module based on each of two axes which are perpendicular to each other, at least by using an elastic characteristic of the hinge member, wherein the optical module comprises an image sensor;
   a base member to which the hinge member is installed; and
   a driving motor which rotates the hinge member based on the each of the two axes with respect to the base member,
   wherein the hinge member comprises an upper body, a middle body disposed below the upper body and a lower body disposed below the middle body,
   wherein the optical nodule is attached to the upper body, and the base member is attached to the lower body, and
   wherein the member hinge member configured to support movement of the upper body relative to the middle body b the elastic characteristic of the hinge member and to support movement of the middle body relative to the lower body by using the elastic characteristic of the hinge member.

2. The shake correction module of claim 1, wherein the optical module is accommodated by the hinge member, and
   wherein the upper body is configured to rotate with respect to the base member based on each of the two axes at least by using the elastic characteristic of the hinge member.

3. The shake correction module of claim 1,
   wherein the upper body and the middle body are connected to each other by at least one first hinge having the elastic characteristic so that the upper body rotates based on a first axis among the two axes with respect to the middle body,
   wherein the middle body and the lower body are connected to each other by at least one second hinge having the elastic characteristic so that the middle body rotates based on a second axis among the two axes with respect to the lower body, and
   wherein the optical module is installed to the upper body.

4. The shake correction module of claim 3, wherein the lower body of the hinge member is combined to the base member.

5. The shake correction module of claim 4, wherein the upper body and the middle body, connected to each other, form a structure enclosing the optical module therein, and
   wherein the at least one first hinge comprises two hinges facing each other in a direction of the first axis.

6. The shake correction module of claim 5, wherein the at least one second hinge comprises two hinges facing each other in a direction of the second axis.

7. The shake correction module of claim 1, wherein the driving motor is a voice coil motor (VCM) unit comprising pairs of first VCMs that face each other in the first axis direction, and pairs of second VCMs that face each other in the second axis direction perpendicular to the first axis direction, and
   wherein each pair of the first and second VCMs comprises a magnet and a coil.

8. The shake correction module of claim 7, wherein the magnets are installed to sides of the hinge member, and the coils are installed spaced apart from the magnets in correspondence to the magnets.

9. The shake correction module of claim 8, wherein the hinge member is rotated with respect to the base member based on the each of the first and second axes according to current flows applied in the coils.

10. The shake correction module of claim 8, wherein the optical module is accommodated by the hinge member, and wherein the upper body is configured to rotate with respect to the base member based on each of the two axes at least by using the elastic characteristic of the hinge member and according to current flows formed in the coils.

11. The shake correction module of claim 1, further comprising a housing combined to the base member to surround an outer wall of the base member,
    wherein the housing comprises a material for shielding an electromagnetic interference (EMI) and prevents foreign substances from entering the optical module from outside.

12. The shake correction module of claim 1, wherein an intersecting point of the two axes corresponds to a center of an imaging surface of the image sensor.

13. The shake correction module of claim 1, wherein the two axes cross each other on a same plane.

14. A camera module comprising:
    an optical module comprising an image sensor; and
    a shake correction module comprising:
      a hinge member which supports rotation movement of an optical module based on each of two axes which are perpendicular to each other, at least by using an elastic characteristic of the hinge member;
      a base member to which the hinge member is installed; and
      a driving motor which rotates the hinge member based on each of the two axes with respect to the base member,
      wherein the hinge member comprises an upper body, a middle body disposed below the upper body, and a lower body disposed below the middle body,
      wherein the optical module is attached to the upper body and the base member is attached to the lower body, and
      wherein the hinge member is configured to support movement of the upper body relative to the middle body by using the elastic characteristic of the hinge member and to support movement of the middle body relative to the lower body by using the elastic characteristic of the hinge member.

15. The camera module of claim 14, further comprising a flexible printed circuit board (PCB),
    wherein one part of the flexible PCB is electrically connected to the optical module and at least one other part of the flexible PCB is combined to a fixed portion of the shake correction module, and
    wherein the optical module is electrically connected through the flexible PCB with an outside element.

16. The camera module of claim 15, wherein the one part of the flexible PCB is fixed to a lower part of one side of the optical module and a middle part of the flexible PCB is fixed to a part of the base member opposite to the lower part of the optical module.

17. The camera module of claim 16, wherein the optical module is accommodated by the hinge member, and
    wherein the upper body is configured to rotate with respect to the base member based on each of the two axes at least by using the elastic characteristic of the hinge member.

18. The camera module of claim 16, wherein the one part and the middle part of the flexible PCB are disposed to have different heights in a perpendicular direction to a photography surface of the image sensor so that a cross-section of the flexible PCB forms a curve.

19. The camera module of claim 18, wherein the curve comprises at least one point of inflection.

20. The camera module of claim 15, wherein the one part and the at least one other part of the flexible PCB are supported by reinforcing plates, respectively.

21. The camera module of claim 16, wherein the middle part of the flexible PCB is fixed to the base member in such a way that at least one protrusion protruding from the part of the base member toward the flexible PCB penetrates at least the flexible PCB, and is thermally fused to have wider end portion.

22. The camera module of claim 16, wherein the middle part of the flexible PCB is fixed to the base member by fixing protrusions protruding from the base member.

23. The camera module of claim 16, wherein the optical module comprises the image sensor and a hard printed circuit board (PCB) that is electrically connected to a bottom side of the image sensor and the one part of the flexible PCB is attached to the hard PCB by an anisotropic conductive film (ACF) to which conductive balls are attached.

24. The camera module of claim 16, wherein the shake correction module comprises solder plates that electrically connect the driving motor to the flexible PCB, and
wherein a part of the flexible PCB adjacent to the middle part of the flexible PCB is electrically connected to the solder plates, and thus fixed to the base member.

25. A method of manufacturing a camera module, the method comprising:
providing a shake correction module for driving an optical module comprising an image sensor to rotate based on two axes and supporting motion of the optical module;
inserting the optical module in the shake correction module;
disposing a flexible printed circuit board (PCB) that electrically connects the optical module with an outside element;
electrically connecting and fixing one part of the flexible PCB to the optical module; and
fixing another part of the flexible PCB to a fixed portion of the shake correction module,
wherein the shake correction module comprises a hinge member comprising an upper body, a middle body disposed below the upper body and a lower body disposed below the middle body, and the optical module is attached to the upper body, and
wherein the hinge member is configured to support movement of the upper body relative to the middle body by using the elastic characteristic of the hinge member and to support movement of the middle body relative to the lower body by using the elastic characteristic of the hinge member.

26. The method of claim 20, wherein the one part and another part of the flexible PCB are disposed to have different heights in a perpendicular direction to a photography surface of the image sensor so that a cross-section of the flexible PCB forms a curve.

27. The shake correction module of claim 1, wherein the hinge member comprises an elastic material.

28. The camera module of claim 14, wherein the hinge member comprises an elastic material.

* * * * *